United States Patent
Zhang et al.

(10) Patent No.: US 12,143,186 B2
(45) Date of Patent: Nov. 12, 2024

(54) SYSTEMS AND METHODS FOR PROVIDING NETWORK INDICATIONS FOR SELECTING ASYMMETRIC UPLINK (UL) ANTENNA PANELS AT USER EQUIPMENT (UE)

(71) Applicant: Apple Inc., Cupertino, CA (US)

(72) Inventors: Yushu Zhang, Beijing (CN); Oghenekome Oteri, San Diego, CA (US); Weidong Yang, San Diego, CA (US); Sigen Ye, Whitehouse Station, NJ (US); Haitong Sun, Cupertino, CA (US); Chunhai Yao, Beijing (CN); Dawei Zhang, Saratoga, CA (US); Chunxuan Ye, San Diego, CA (US); Wei Zeng, Saratoga, CA (US); Hong He, San Jose, CA (US); Huaning Niu, San Jose, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,809

(22) PCT Filed: Aug. 5, 2020

(86) PCT No.: PCT/CN2020/107033
§ 371 (c)(1),
(2) Date: Feb. 10, 2022

(87) PCT Pub. No.: WO2022/027295
PCT Pub. Date: Feb. 10, 2022

(65) Prior Publication Data
US 2023/0155657 A1    May 18, 2023

(51) Int. Cl.
H04B 7/06        (2006.01)
H04B 7/0404   (2017.01)
(Continued)

(52) U.S. Cl.
CPC ......... *H04B 7/0691* (2013.01); *H04B 7/0404* (2013.01); *H04W 8/24* (2013.01); *H04W 52/365* (2013.01)

(58) Field of Classification Search
CPC ..... H04B 7/0691; H04B 7/0404; H04W 8/24; H04W 52/365
See application file for complete search history.

(56) References Cited

U.S. PATENT DOCUMENTS 9,979,453 B2 *  5/2018  Wang .............. H04L 5/006
11,158,929 B2 * 10/2021  Shi ................. G06F 1/1683
(Continued)

FOREIGN PATENT DOCUMENTS

| CN | 109219127 A | 1/2019 |
| CN | 110537334 A | 12/2019 |

(Continued)

OTHER PUBLICATIONS

LG Electronics, "Discussion on multi-beam based operations and enhancements," 3GPP TSG RAN WG1 Meeting #97, R1-1906731, May 17, 2019 (May 17, 2019).

(Continued)

*Primary Examiner* — Dominic E Rego
(74) *Attorney, Agent, or Firm* — Blank Rome LLP

(57) ABSTRACT

A method for wireless communication includes: receiving, at a base station: (1) a capability report for each of a plurality of antenna panels of a first user device; and (2) an initial antenna panel index for the first user device; transmitting, to the first user device, configuration information corresponding to each antenna panel of the plurality; selecting first configuration information corresponding to the antenna panel with the initial antenna panel index; and receiving a first uplink transmission from the first user device, wherein the first user device uses a selected first antenna panel (Continued)

corresponding to the initial antenna panel index and the first configuration information corresponding to the selected first antenna panel. In other aspects, rather than initially transmitting configuration information corresponding to each antenna panel, the base station may transmit the configuration information for each panel as it is selected by the first user device for an uplink transmission.

12 Claims, 14 Drawing Sheets

(51) Int. Cl.
*H04W 8/24* (2009.01)
*H04W 52/36* (2009.01)

(56) References Cited

U.S. PATENT DOCUMENTS

| | | | |
|---|---|---|---|
| 2010/0233973 A1* | 9/2010 | Churan | H04B 7/18515 455/114.2 |
| 2017/0230091 A1* | 8/2017 | Song | H04B 7/0617 |
| 2020/0007201 A1* | 1/2020 | Liu | H04B 7/0478 |
| 2020/0029274 A1 | 1/2020 | Cheng | |
| 2020/0106168 A1 | 4/2020 | Hakola | |
| 2020/0136711 A1* | 4/2020 | Cao | H04B 7/0626 |
| 2020/0169995 A1* | 5/2020 | Nam | H04W 72/21 |
| 2020/0205150 A1* | 6/2020 | Cheng | H04W 72/21 |
| 2020/0228180 A1* | 7/2020 | Zhang | H04B 7/0628 |
| 2020/0229104 A1 | 7/2020 | MolavianJazi | |
| 2020/0267712 A1* | 8/2020 | Cirik | H04W 72/23 |
| 2023/0078339 A1* | 3/2023 | Haghighat | H04B 7/088 370/329 |

FOREIGN PATENT DOCUMENTS

| | | |
|---|---|---|
| CN | 110868231 A | 3/2020 |
| CN | 110912665 A | 3/2020 |
| WO | 2020037207 A1 | 2/2020 |
| WO | 2020088225 A1 | 5/2020 |

OTHER PUBLICATIONS

Samsung, "Handling UE Types in FR2," 3GPP TSG-RAN WG4 Meeting #87, R4-1806430, May 25, 2018 (May 25, 2018).

* cited by examiner

SYSTEMS AND METHODS FOR PROVIDING NETWORK INDICATIONS FOR SELECTING ASYMMETRIC UPLINK (UL) ANTENNA PANELS AT USER EQUIPMENT (UE)

FIELD

The present application relates to wireless devices, including apparatuses, systems, and methods to assist in the selection of asymmetric uplink (UL) antenna panels for user equipment (UE or "user device") uplink transmissions in a cellular communications system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA. 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Apparatuses, systems, and methods are disclosed herein to assist in the selection of asymmetric uplink (UL) antenna panels for user equipment (UE or "user device") uplink transmissions in a cellular communications system. (As used herein, the term "asymmetric" refers to different UE antenna panels that have different properties from one another, e.g., different number of antennas, etc.) In particular, in 5G/NR, in order to enhance the link budget (i.e., a calculation of the total gain and loss in the system to conclude the received signal receiving power (RSRP) at the UE), a UE may comprise multiple "antenna panels."

Antenna panel, as used herein, may be defined as a transmission process, transmission entity, antenna array(s), or antenna port group(s). An antenna panel may include one or multiple antennas arrays, wherein the same orientation angle is applied to a given antenna array. Different antenna panels within a UE may, e.g., be orthogonal or non-orthogonal to one another. Alternatively, an antenna panel may include antennas with the same orientation angle as well as the same polarization. The antenna panel that is to be used for a given UL transmission by a particular UE may, e.g., be selected by a gNodeB ("gNB") using control signaling, as carried in, e.g. Downlink Control Information (DCI), Medium Access Control (MAC) Control Element (CE), and/or Radio Resource Control (RRC). Alternately, the antenna panel may be selected by a UE and reported to a gNB using uplink signaling, e.g. uplink control information carried by the Physical Uplink Control Channel (PUCCH), Physical Uplink Shared Channel (PUSCH), and/or MAC CE.

Each antenna panel of a UE may be configured to target a different transmission direction. An analog beam may be applied for each antenna panel. To communicate more effectively with a gNB, an antenna panel with a higher link budget can be selected for UL transmissions. In some implementations, a UE can select one (or more) antenna panels to transmit uplink signals to a base station, such as a gNB, in one or more uplink channels, e.g., the PUSCH, PUCCH, Sounding Reference Signal (SRS) and/or the Physical Random Access Channel (PRACH). In cases where more than one antenna panel, e.g., N antenna panels, may be selected for UL transmission, in some implementations, the UE and/or gNB may select the N available UE antenna panels having the best transmission capabilities and/or signal qualities.

In general, to support antenna panel selection for UEs with antenna panels having different properties, various control signaling schemes could be employed. For example, in some aspects, dynamic panel and control signaling switching could be employed, as will be described in greater detail below with reference to FIGS. 8, 10, and 13. In other aspects, control signaling updates may be transmitted whenever a new antenna panel is selected for UL transmission, as will be described in greater detail below with reference to FIGS. 9, 11, and 14.

Different antenna panels may also have different maximum transmission power, therefore a power headroom report (PHR) may be transmitted by a UE to help a gNB to identify the PHR change (see, e.g., 3GPP Technical Specification 38.321 at Section 5.4.6—"Power Headroom Reporting"). Thus, according to some aspects, a PHR can be triggered in response to any one or more of the following conditions: any time the UE selects a new antenna panel, or any time the UE selects a new antenna panel, wherein a gap between the maximum transmission power of the selected new antenna panel and a previously selected antenna panel is larger than a threshold. In some aspects, a UE may also transmit a "virtual PHR" for one or more inactive antenna panels of the UE any time that a "normal" or "Type 1" PHR is triggered at the UE. While a Type 1 PHR is calculated based on an actual PUSCH transmission for a UE, if there is no PUSCH transmission scheduled for a given antenna panel, a UE may report a "virtual PHR," also referred to as "Type 3" PHR, for the inactive antenna panel, as is defined in 3GPP Technical Specification 38.213 at Section 7.7.3.

The techniques described herein may be applicable in various different frequency ranges, e.g., the Frequency Range 2 (FR2) high frequency band defined in 5G/NR. However, they may also have usefulness in other frequency bands, such as the so-called FR1 and/or FR4 bands in 5G/NR.

Thus, according to some aspects disclosed herein, a method for wireless communication is disclosed, the method including: receiving, at a base station: (1) a capability report for each of a plurality of antenna panels of a first user device; and (2) an initial antenna panel index for the first user device; transmitting, to the first user device, configuration information corresponding to each antenna panel of the plurality; selecting first configuration information corresponding to the antenna panel with the initial antenna panel index; and receiving a first uplink transmission from the first user device, wherein the first user device uses a selected first antenna panel corresponding to the initial antenna panel index and the first configuration information corresponding to the selected first antenna panel. In other aspects, rather than initially transmitting configuration information corresponding to each antenna panel, the base station may transmit the configuration information for each panel as it is selected by the first user device for an uplink transmission.

The techniques described herein may be implemented in and/or used with a number of different types of devices, including but not limited to cellular phones, wireless devices, base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings, in which.

Figure 1:
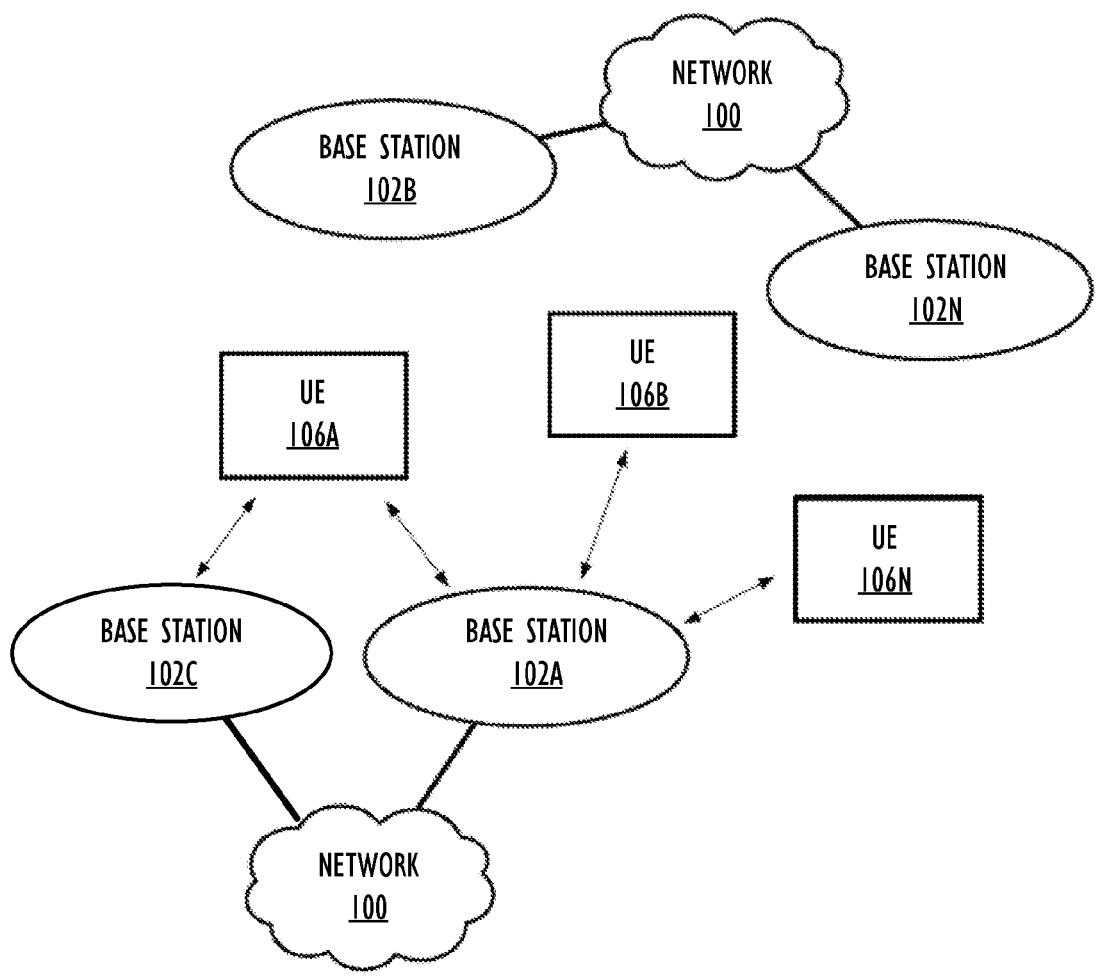
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alteratives falling within the spirit and scope of the subject matter as defined by the appended claims.

DETAILED DESCRIPTION

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "user device"/"UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the terms "user device," "UE," or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an "eNodeB" or "eNB." If the base station is implemented in the context of 5G NR, it may alternately be referred to as a "gNodeB" or "gNB."

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
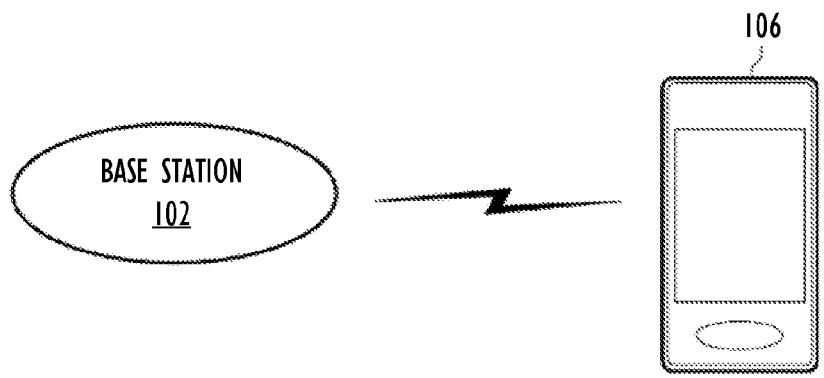
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the methods described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the methods described herein, or any portion of any of the methods described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Example Communication Device

Figure 3:
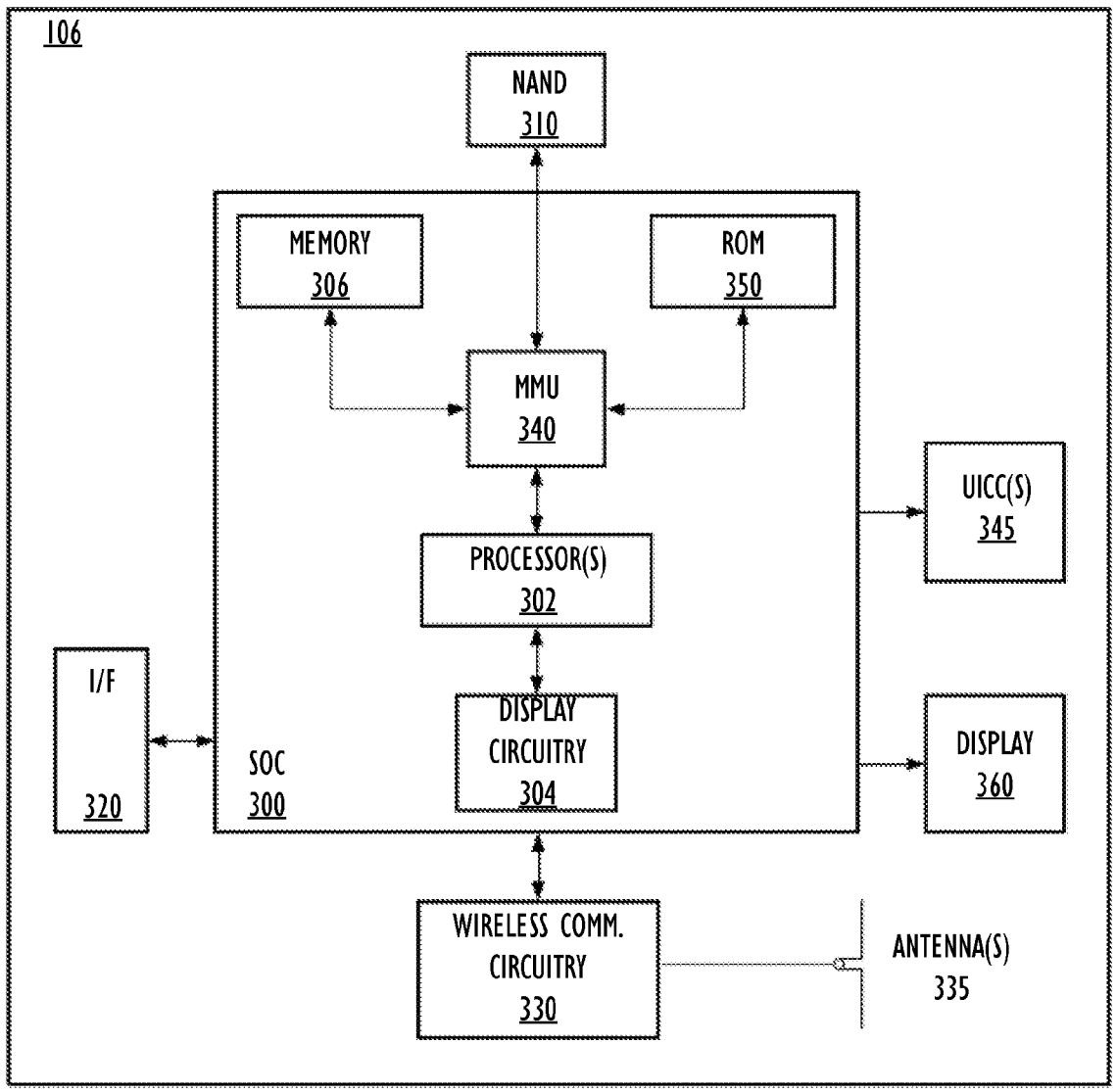
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively: directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 36). The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
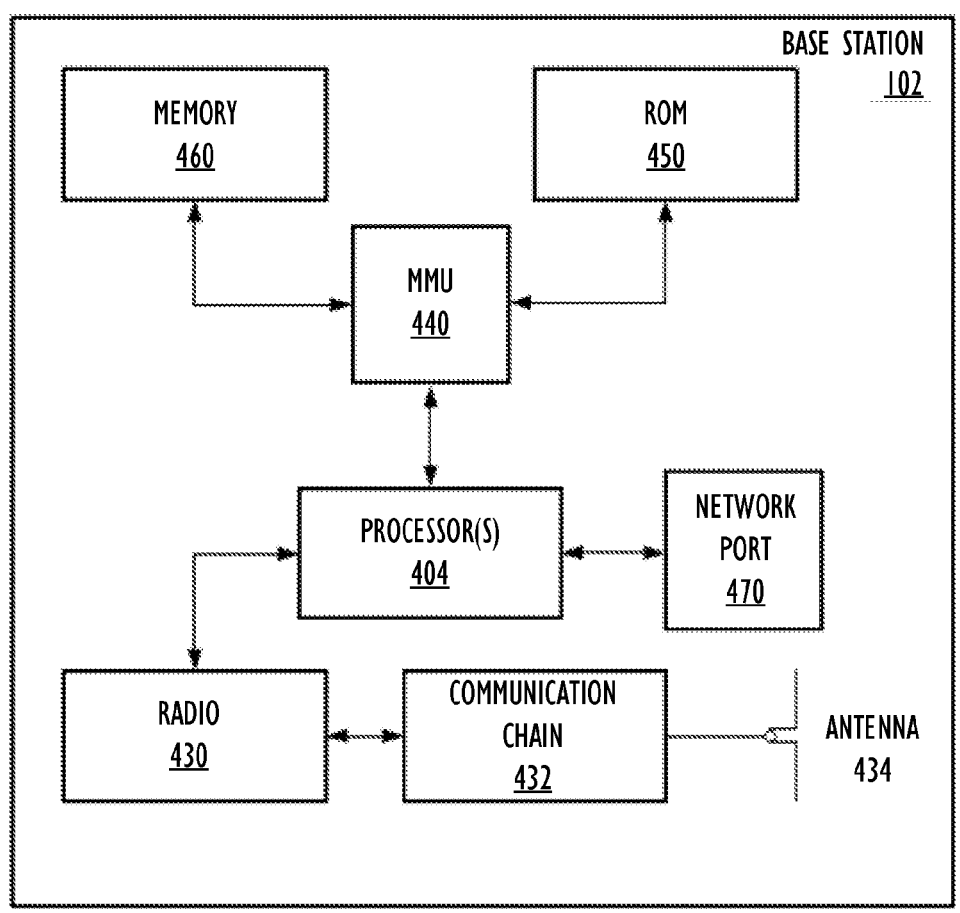
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A. GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000. UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
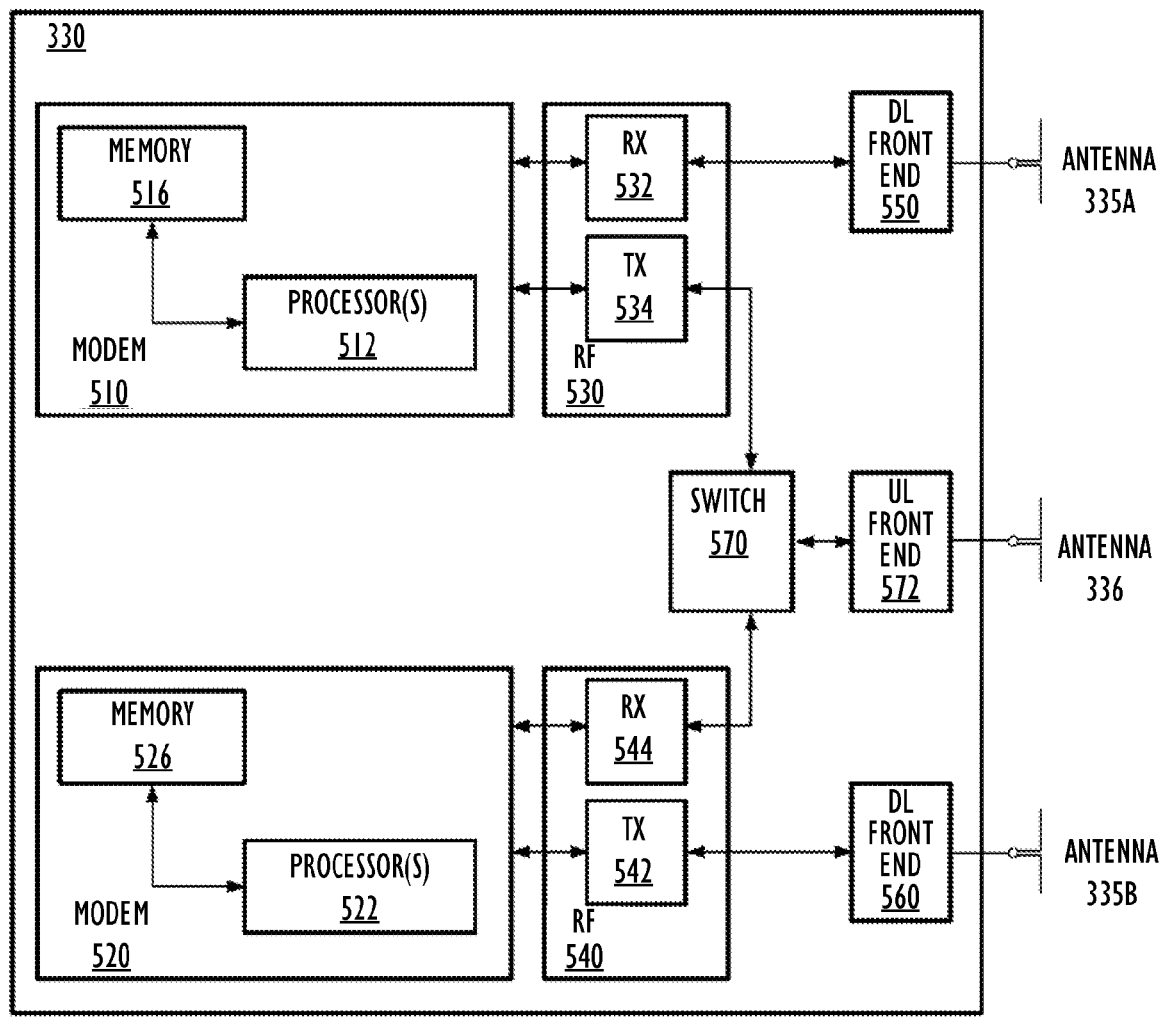
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335*b*.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some aspects, the cellular communication circuitry 330 may also not include the switch 570, and the RF front end 530 or the RF front end 540 may be in communication, e.g., directly, with the UL front end 572.

Example Network Element

Figure 6:
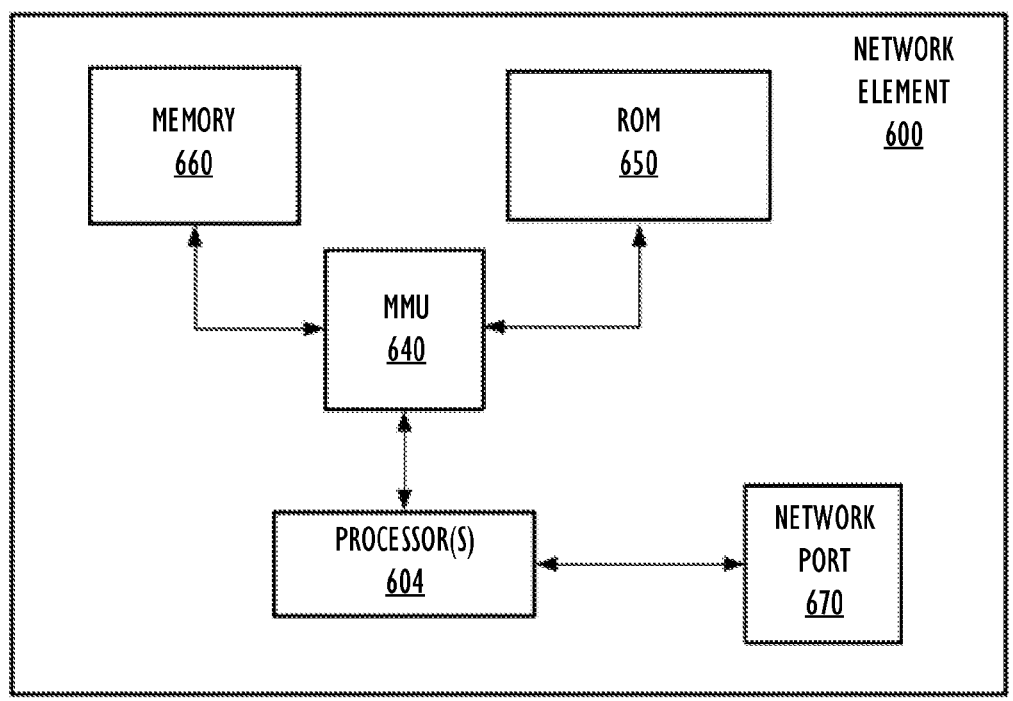
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
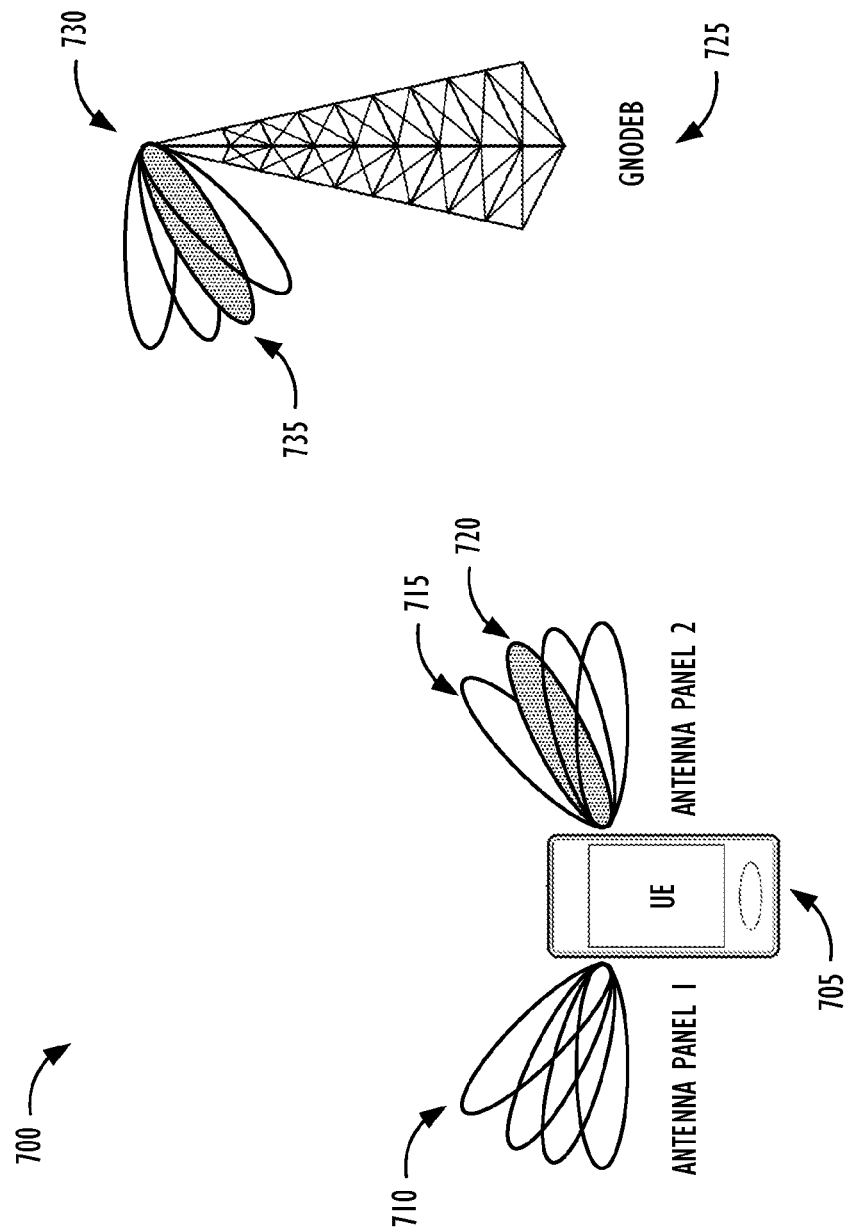
FIG. 7 illustrates an exemplary multi-antenna panel UE communicating with an exemplary gNodeB, according to some aspects.

User Equipment (UE) Uplink (UL) Antenna Panel Selection for Asymmetric Antennal Panels Turning now to FIG. 7, a scenario 700 illustrating an exemplary multi-antenna panel UE 705 communicating with an exemplary gNodeB (gNB) 725 is shown, according to some aspects. Exemplary UE 705 is illustrated as comprising a first antenna panel, "Antenna Panel 1" (710), as well as a second antenna panel, "Antenna Panel 2" (715), although it is to be understood that more (or fewer) antenna panels may be present in a given UE. As stated above, each antenna panel may comprise a transmission process, transmission entity, antenna array(s), or antenna port group(s). An antenna panel may include one or multiple antennas arrays, wherein the same orientation angle is applied to a given antenna array. Different antenna panels within a UE may target different directions and may, e.g., be orthogonal or non-orthogonal to one another.

In the illustrated scenario 700, as indicated by the shaded ellipse 720, UE 705 is using beam 720 from Antenna Panel 2 (715) to communicate with exemplary gNB 725. In particular, as indicated by the shaded ellipse 735, gNB 725 is using beam 735 to communicate with exemplary UE 705. As will be described in further detail herein, it may be beneficial for the antenna panel selected for UL transmissions by UE 705 to change over time, e.g., based on the capabilities and/or signal conditions that are being reported by the various antenna panels of the UE 705.

Different UE antenna panels may have different properties, which properties may be reported to a base station in the form of a capability report. For example, each antenna panel's properties may comprise: an equivalent isotropically radiated power (EIRP); a number of beams, a power amplifier (PA) architecture; and/or a number of radio frequency (RF) chains.

With regard to the use of different number of beams in different UE panels, a UE may report the following information for each panel: a maximum number of SRS resources for beam management; and/or a number of Rx/Tx beams.

With regard to different PA architectures used by the UE (e.g., a 23 dBm+23 dBm PA architecture, or a 20 dBm+20 dBm PA architecture, etc.) in different antenna panels, the UE may report the following information for each panel: whether the UE can support uplink full power transmission; and/or for any supported uplink full power transmission mode, the parameters for the mode, e.g., SRS resource configuration, full power Transmitted Precoding Matrix Indicator (TPMI) groups, etc.

With regard to different numbers of RF chains and antenna architectures used in different UE antenna panels, the UE may report the following information for each antenna panel: a maximum number of ports per SRS resource; an uplink codebook subset, e.g. coherent, partial-coherent, and non-coherent; a maximum number of layers for uplink transmission; and/or a supported SRS for antenna switching configuration in the form of xTyR, e.g., 1T4R (one antenna for transmission, four antennas for reception), 1T2R (one antenna for transmission, two antennas for reception), etc.

According to various aspects disclosed herein, a UE may report its different antenna panel properties to a base station, e.g., in the form of a capability report, in order to ensure that the UE and base station maintain the same understanding about the current capabilities of the UE's various antenna panels. These capability reports may be transmitted to the based station, e.g., periodically, a periodically, in response to certain triggering events, at configurable times, and/or in response to the selection of a new antenna panel for UL transmission.

According to some aspects disclosed herein, the antenna panel to be used by a UE for UL transmissions may be selected by a base station, such as a gNB, by using control signaling, e.g., in the DCI, MAC CE and/or RRC. Alternately, the antenna panel to be used for UL transmissions may be selected by the UE and reported to base station using uplink signaling, e.g., in the form of uplink control information carried by the PUCCH, PUSCH, and/or MAC CE.

With regard to different number of beams in different UE antenna panels, a base station may configure the following information for each antenna panel (e.g., either initially for all antenna panels, or via updates each time that a new antenna panel is selected for UL transmissions): a number of SRS resources for beam management; and/or a number of Channel State Information-Reference Signal (CSI-RS) resources in a resource set for beam management.

With regard to different PA architectures that may be used in different UE antenna panels, a base station may configure the following information for each antenna panel (e.g., either initially for all antenna panels, or via updates each time that a new antenna panel is selected for UL transmissions): an uplink full power transmission mode; and/or configuration of SRS resources for codebook-based transmission. e.g., a number of resources, number of ports, etc.

With regard to different numbers of RF chains and antenna architectures that may be used in different UE antenna panels, a base station may configure the following information for each antenna panel: a number of ports for SRS resources; an uplink codebook subset; a maximum number of layers for uplink transmission; and/or a number of SRS resources for antenna switching.

Figure 8:
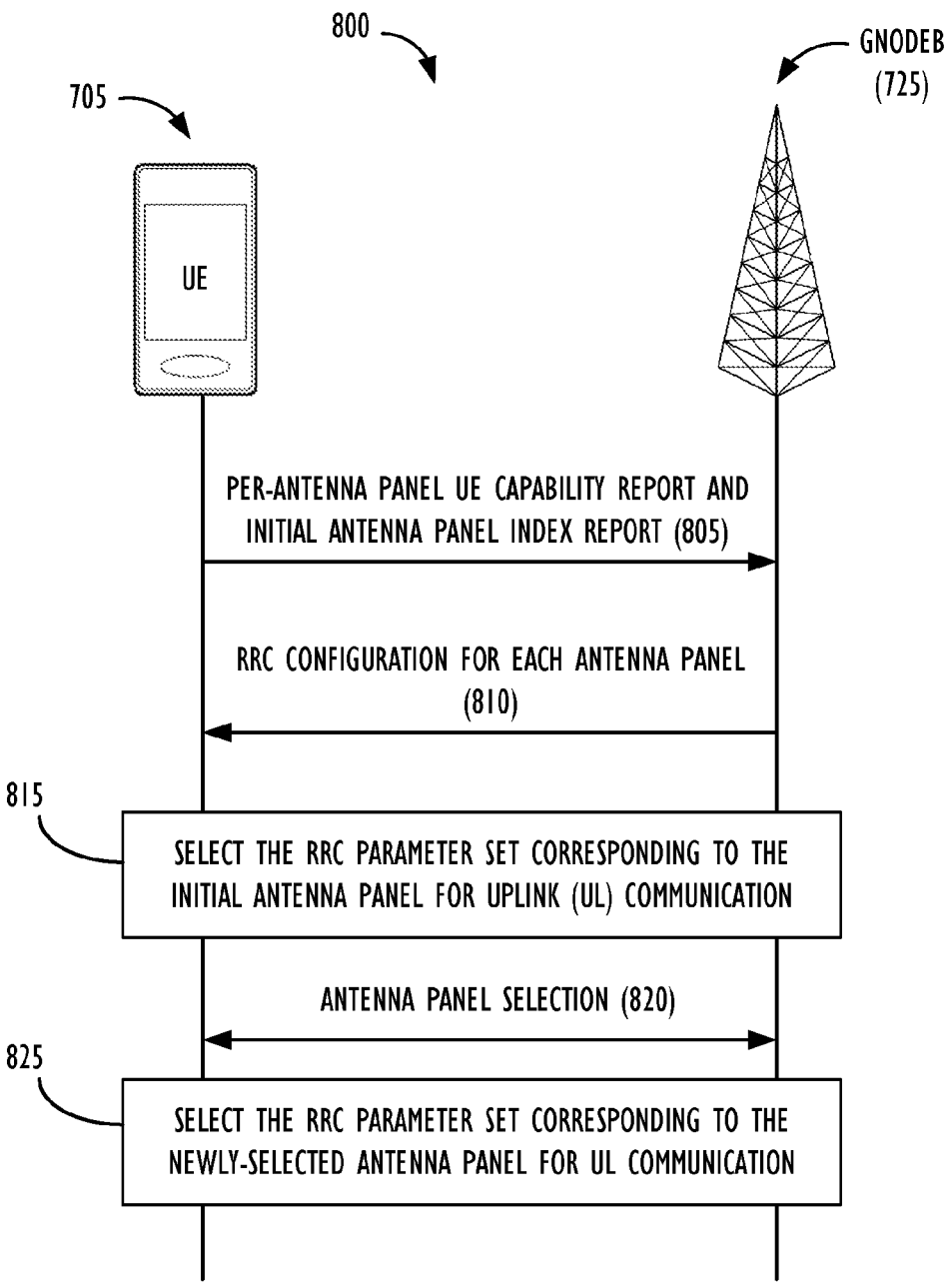
FIG. 8 illustrates an exemplary process of supporting dynamic antenna panel and control signaling switching, according to some aspects.

Turning now to FIG. 8, an exemplary process 800 of supporting dynamic antenna panel and control signaling switching is shown, according to some aspects. According to process 800, first, at Step 805, the UE 705 may transmit a per-antenna panel UE capability report and an initial antenna panel index report (805) to the base station, in this case, gNB 725. The initial antenna panel index may be used to indicate which antenna panel the UE (and/or gNB) has selected to use for the initial UL communication. In some aspects, the antenna panel with the currently best beam quality may be selected. In some cases, UL beam quality may even be measured/estimated by a UE during downlink (DL) transmissions on the same antenna panels. Next, at Step 810, the gNB 725 may report back configuration information (e.g., RRC configuration information in the form of an RRC parameter set) for each UE antenna panel. At Step 815, either the UE 705 or the gNB 725 may select the RRC parameter set corresponding to the initial antenna panel selected for uplink (UL) communication. At some later time, at Step 820, a new (e.g., second) antenna panel may be selected, again, either the UE 705 or the gNB 725, depending on implementation. Finally, at Step 825, either the UE 705 or the gNB 725 may select the RRC parameter set corresponding to the newly-selected antenna panel for uplink (UL) communication.

Figure 9:
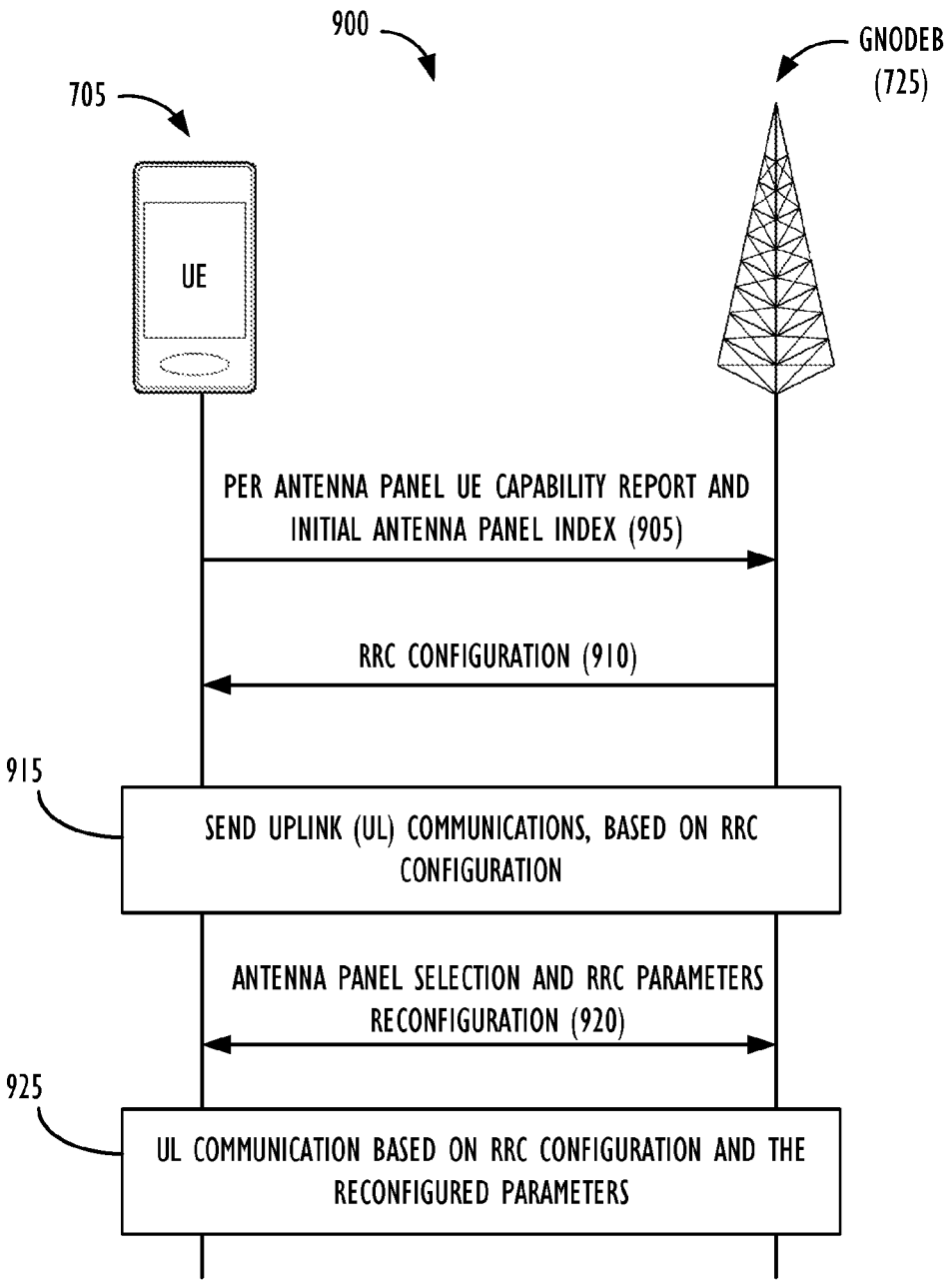
FIG. 9 illustrates an exemplary process of supporting control signaling updates when a new antenna panel is selected for UL transmission, according to some aspects.

Turning now to FIG. 9, an exemplary process 900 of supporting control signaling updates when a new antenna panel is selected for UL transmission is shown, according to some aspects. According to process 900, first, at Step 905, the UE 705 may transmit a per-antenna panel UE capability report and an initial antenna panel index report (905) to the base station, in this case, gNB 725. Next, at Step 910, the gNB 725 may report back configuration information (e.g., RRC configuration information in the form of an RRC parameter set) corresponding to the antenna panel indicated by the initial antenna panel index. At Step 915, the UE 705 may send UL communications to the gNB 725 using the received RRC parameter set corresponding to the initial antenna panel selected for uplink (UL) communication. At some later time, at Step 920, a new (e.g., second) antenna panel may be selected, either the UE 705 or the gNB 725, depending on implementation, at which point new RRC configuration information (e.g., in the form of an RRC parameter set) corresponding to the newly-selected antenna panel may be transmitted to UE 705. Finally, at Step 925, UE 705 may use the RRC configuration information for the newly-selected antenna panel for further uplink (UL) communication.

Figure 10:
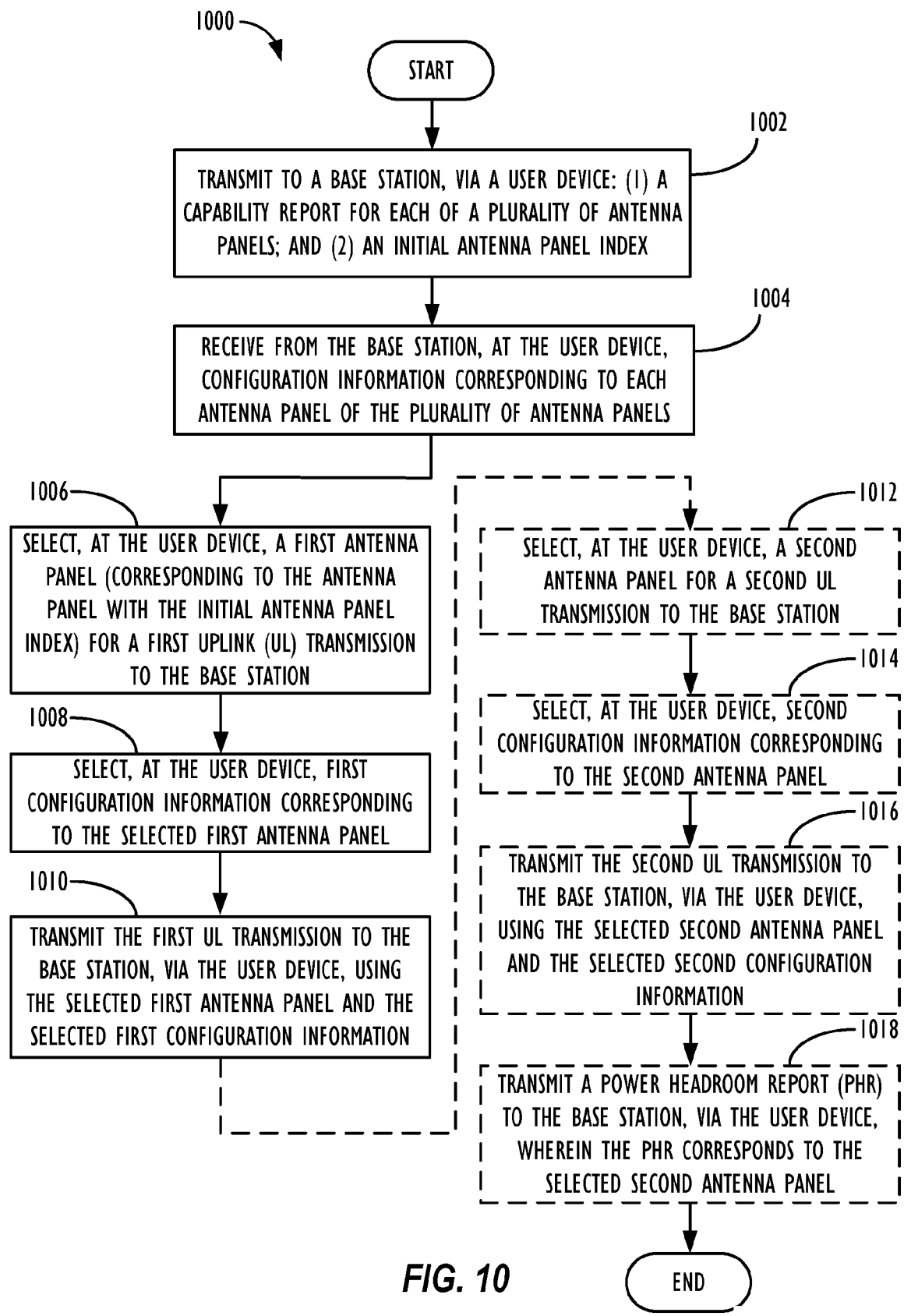
FIG. 10 is a flowchart illustrating an exemplary process for a UE of supporting dynamic antenna panel and control signaling switching, according to some aspects.

Turning now to FIG. 10, a flowchart 1000 illustrating an exemplary process for a UE of supporting dynamic antenna panel and control signaling switching is shown, according to some aspects. First, at Step 1002, the process may transmit to a base station, via a user device: (1) a capability report for each of a plurality of antenna panels, and (2) an initial antenna panel index. Next, at Step 1004, the process may receive from the base station, at the user device, configuration information corresponding to each antenna panel of the plurality of antenna panels. Next, at Step 1006, the process may select, at the user device, a first antenna panel (corresponding to the antenna panel with the initial antenna panel index) for a first uplink (UL) transmission to the base station. Next, at Step 1008, the process may select, at the user device, first configuration information corresponding to the selected first antenna panel. Next, at Step 1010, the process may transmit the first UL transmission to the base station, via the user device, using the selected first antenna panel and the selected first configuration information.

At Step 1012, e.g., if the UE or base station determines to use a different antenna panel for UL transmission, the process may select, at the user device, a second antenna panel (e.g., a different antenna panel than the first antenna panel) for a second UL transmission to the base station. Next, at Step 1014, the process may select, at the user device, second configuration information corresponding to the second antenna panel. Next, at Step 1016, the process may transmit the second UL transmission to the base station, via the user device, using the selected second antenna panel and the selected second configuration information. Finally, e.g., due to the selection of a new antenna panel, at Step 1018, the process may transmit a power headroom report to the base station, via the user device, wherein the PHR corresponds to the selected second antenna panel. Elements 1012-1018 are shown in dashed line boxes to indicate that their performance, i.e., the updating of the antenna panel that is to be used for UL transmission, is optional, according to some aspects.

Figure 11:
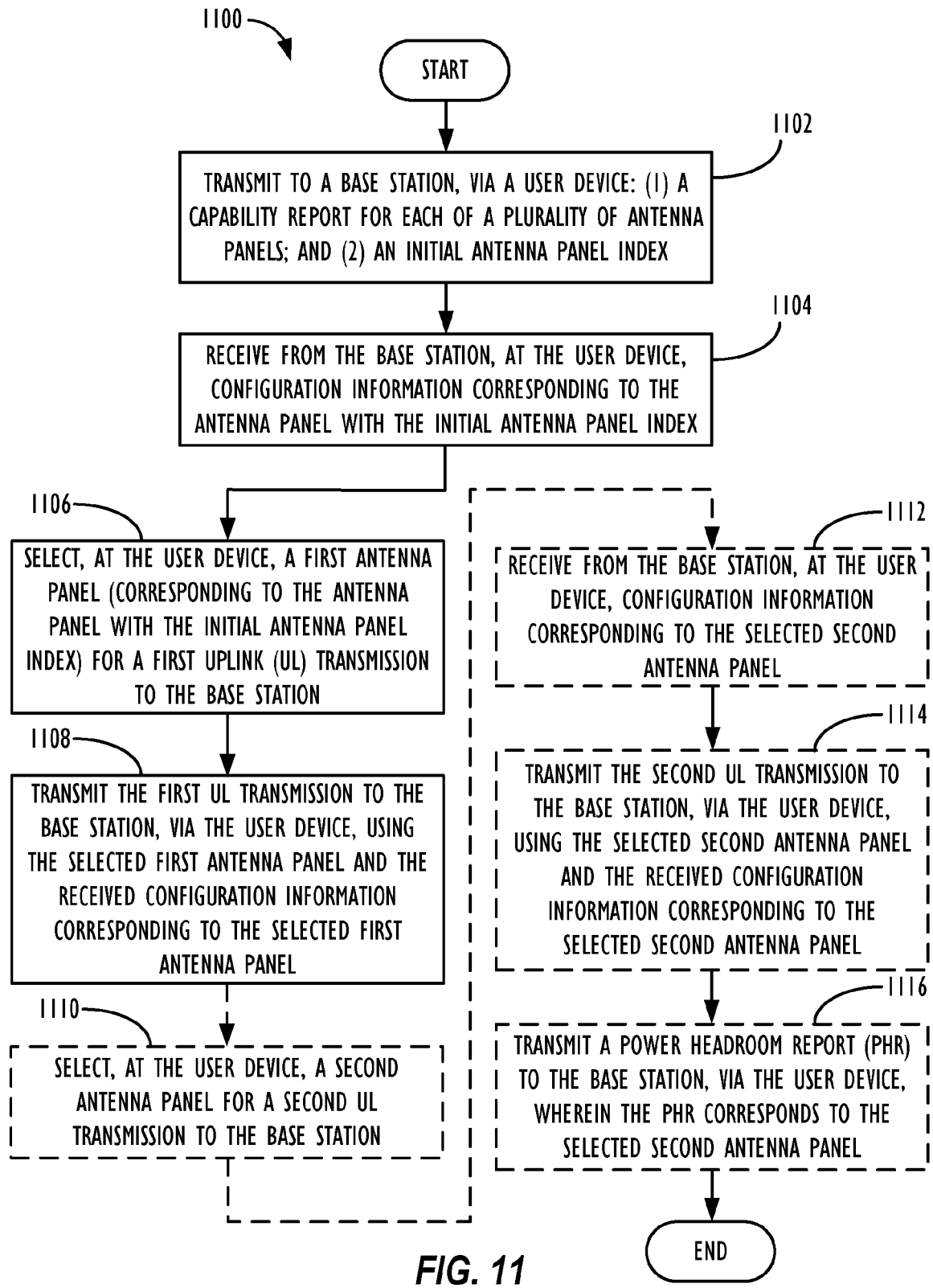
FIG. 11 is a flowchart illustrating an exemplary process for a UE of supporting control signaling updates when a new antenna panel is selected for UL transmission, according to some aspects.

Turning now to FIG. 11, a flowchart 1100 illustrating an exemplary process for a UE of supporting control signaling updates when a new antenna panel is selected for UL transmission is shown, according to some aspects. First, at Step 1102, the process may transmit to a base station, via a user device: (1) a capability report for each of a plurality of antenna panels: and (2) an initial antenna panel index. Next, at Step 1104, the process may receive from the base station, at the user device, configuration information corresponding to the antenna panel with the initial antenna panel index. Next, at Step 1106, the process may select, at the user device, a first antenna panel (corresponding to the antenna panel with the initial antenna panel index) for a first uplink (UL) transmission to the base station. Next, at Step 1108, the process may transmit the first UL transmission to the base station, via the user device, using the selected first antenna panel and the received configuration information corresponding to the selected first antenna panel.

At Step 1110, e.g., if the UE or base station determines to use a different antenna panel for UL transmission, the process may select, at the user device, a second antenna panel (e.g., a different antenna panel than the first antenna panel) for a second UL transmission to the base station. Next, at Step 1112, the process may receive from the base station, at the user device, configuration information corresponding to the selected second antenna panel. Next, at Step 1114, the process may transmit the second UL transmission to the base station, via the user device, using the selected second antenna panel and the received configuration information corresponding to the selected second antenna panel. Finally. e.g., due to the selection of a new antenna panel, at Step 1116, the process may transmit a power headroom report to the base station, via the user device, wherein the PHR corresponds to the selected second antenna panel. Elements 1110-1116 are shown in dashed line boxes to indicate that their performance, i.e., the updating of the antenna panel that is to be used for UL transmission, is optional, according to some aspects.

Figure 12:
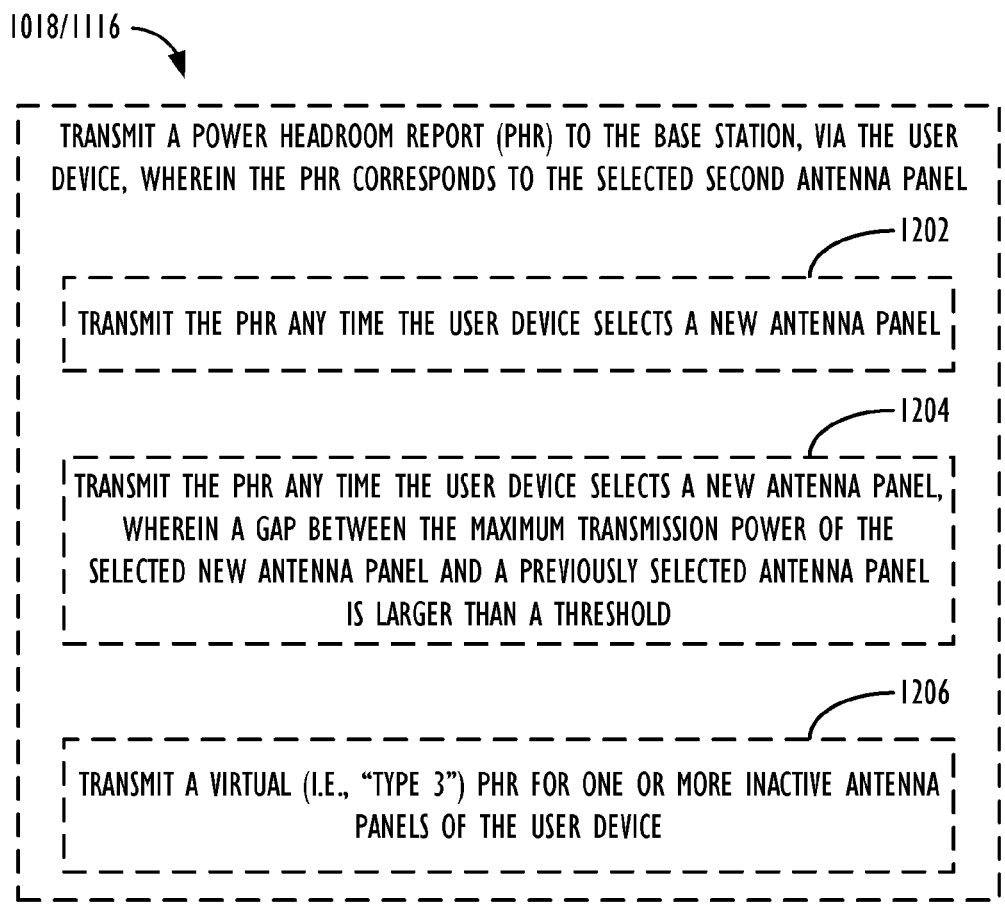
FIG. 12 illustrates exemplary conditions for triggering PHR transmission by a UE, according to some aspects.

Turning now to FIG. 12, exemplary conditions 1202/1204/1206 for triggering PHR transmission by a UE are shown, according to some aspects. Conditions 1202/1204/1206 represent additional possible implementation details related to Step 1018 of FIG. 10 and Step 1116 of FIG. 11. In particular, condition 1202 indicates that the user device may transmit the PHR any time the user device selects a new antenna panel. Condition 1204 indicates that the user device may transmit the PHR any time the user device selects a new antenna panel, wherein a gap between the maximum transmission power of the selected new antenna panel and a previously selected antenna panel is larger than a threshold (e.g., a predetermined or configurable maximum transmission power difference threshold). As may be understood, condition 1204 may be utilized to attempt to prevent over-signaling of PHR to the base station. Condition 1206 indicates that the user device may also transmit a "virtual PHR" for one or more inactive antenna panels of the user device, e.g., any time that a "normal" or "Type 1" PHR is triggered at the UE. According to some aspects, the PHR for each antenna panel may be jointly reported by a MAC CE (or, alternatively, separately reported by different MAC CEs). PHR-related parameters, e.g., phr-PeriodicTimer, phr-ProhibitTimer, phr-Tx-PowerFactorChange, etc., may also be configured separately for inactive antenna panels, i.e., as compared to a "normal" or "Type 1" PHR. Common or separate power control parameters, e.g., values for P0, alpha, pathloss reference signal, etc., for the PHR calculations for each antenna panel may also be individually configured. In some aspects, power headroom for inactive antenna panels may be measured/estimated based on DL measurements from the corresponding antenna panel. In other aspects, the PHR may be given at a UE-level (e.g., based on average values computed across all of a UE's antennas), rather than at an individual antenna panel level, e.g., to conserve signaling overhead.

Figure 13:
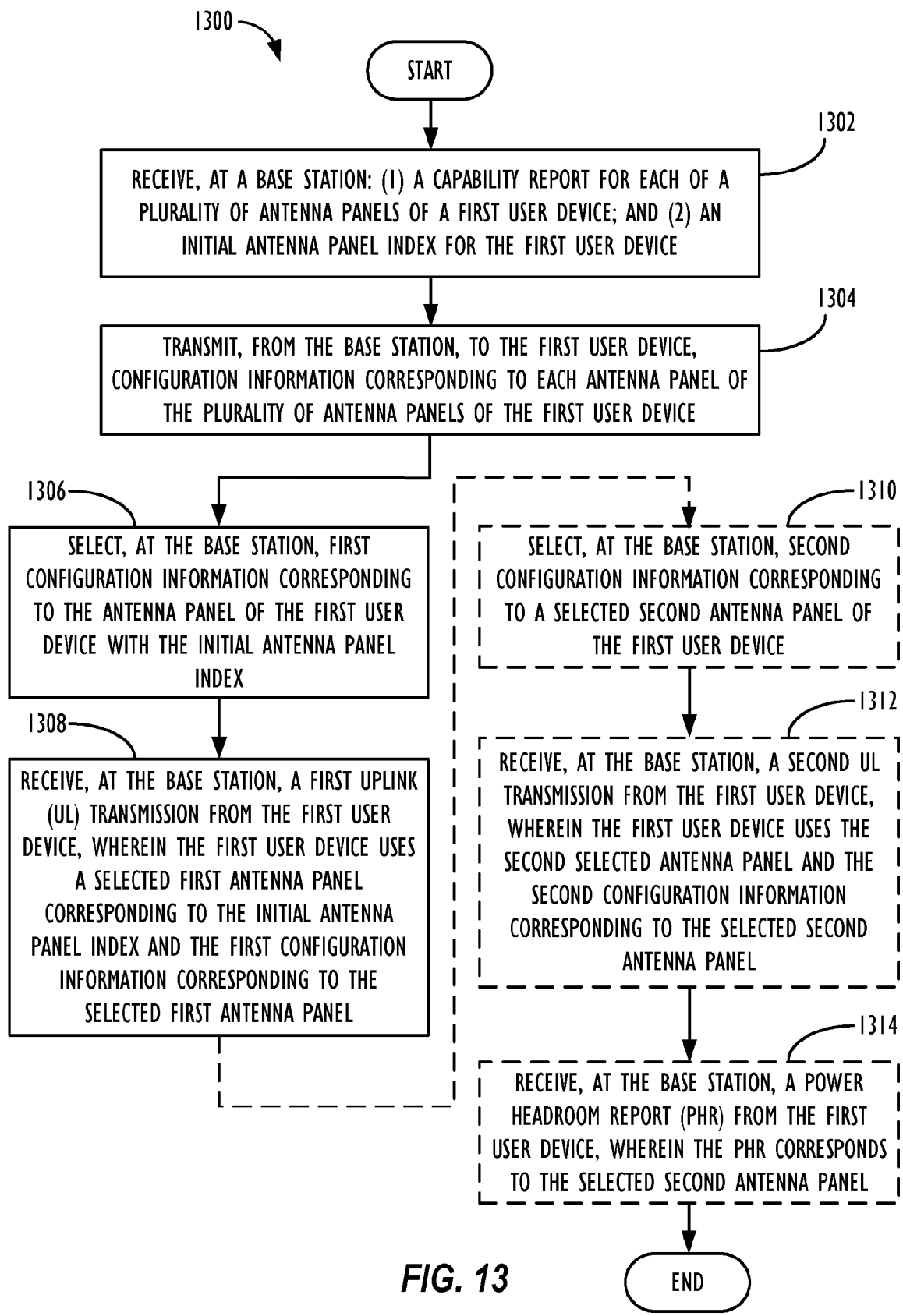
FIG. 13 is a flowchart illustrating an exemplary process for a base station of supporting dynamic antenna panel and control signaling switching, according to some aspects.

Turning now to FIG. 13, a flowchart 1300 illustrating an exemplary process for a base station of supporting dynamic antenna panel and control signaling switching is shown, according to some aspects. First, at Step 1302, the process may receive, at a base station: (1) a capability report for each of a plurality of antenna panels of a first user device, and (2) an initial antenna panel index for the first user device. Next, at Step 1304, the process may transmit, from the base station, to the first user device, configuration information corresponding to each antenna panel of the plurality of antenna panels of the first user device. Next, at Step 1306, the process may select, at the base station, first configuration information corresponding to the antenna panel of the first user device with the initial antenna panel index. Next, at Step 1308, the process may receive, at the base station, a first uplink (UL) transmission from the first user device, wherein the first user device uses a selected first antenna panel corresponding to the initial antenna panel index and the first configuration information corresponding to the selected first antenna panel.

At Step 1310, e.g., if the UE or base station determines to use a different antenna panel for UL transmission, the process may select, at the base station, second configuration information corresponding to a selected second antenna panel of the first user device. Next, at Step 1312, the process may receive, at the base station, a second UL transmission from the first user device, wherein the first user device uses the second selected antenna panel and the second configuration information corresponding to the selected second antenna panel. Finally, e.g., due to the selection of a new antenna panel, at Step 1314, the process may receive, at the base station, a power headroom report (PHR) from the first user device, wherein the PHR corresponds to the selected second antenna panel. Elements 1310-1314 are shown in dashed line boxes to indicate that their performance, i.e., the updating of the antenna panel that is to be used for UL transmission, is optional, according to some aspects.

Figure 14:
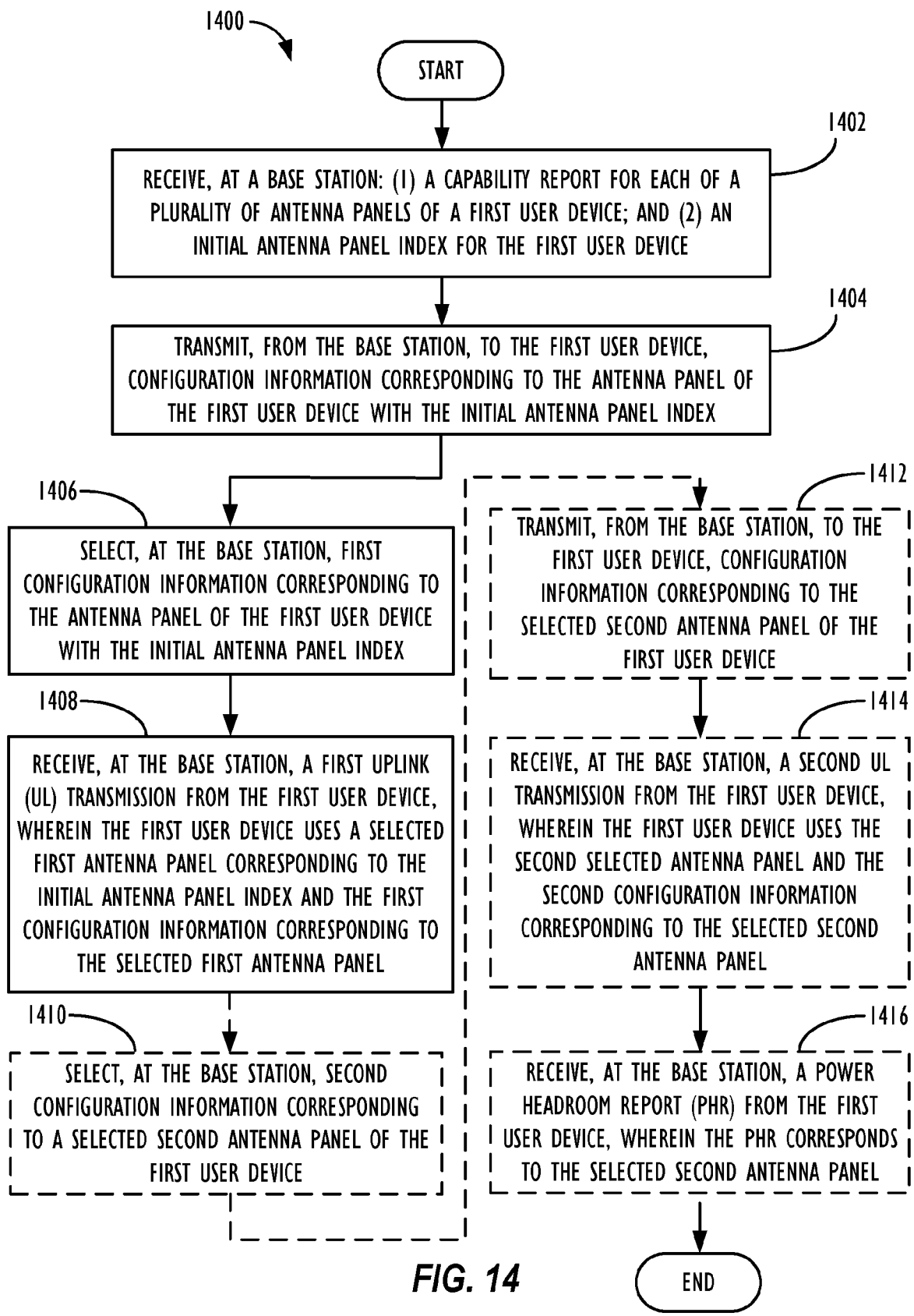
FIG. 14 is a flowchart illustrating an exemplary process for a base station of supporting control signaling updates when a new antenna panel is selected for UL transmission, according to some aspects.

Turning now to FIG. 14 a flowchart 1400 illustrating an exemplary process for a base station of supporting control signaling updates when a new antenna panel is selected for UL transmission is shown, according to some aspects. First, at Step 1402, the process may receive, at a base station: (1) a capability report for each of a plurality of antenna panels of a first user device; and (2) an initial antenna panel index for the first user device. Next, at Step 1404, the process may transmit, from the base station, to the first user device, configuration information corresponding to the antenna panel of the first user device with the initial antenna panel index. Next, at Step 1406, the process may select, at the base station, first configuration information corresponding to the antenna panel of the first user device with the initial antenna panel index. Next, at Step 1408, the process may receive, at the base station, a first uplink (UL) transmission from the first user device, wherein the first user device uses a selected first antenna panel corresponding to the initial antenna panel index and the first configuration information corresponding to the selected first antenna panel.

At Step 1410, e.g., if the UE or base station determines to use a different antenna panel for UL transmission, the process may select, at the base station, second configuration information corresponding to a selected second antenna panel of the first user device. Next, at Step 1412, the process may transmit, from the base station, to the first user device, configuration information corresponding to the selected second antenna panel of the first user device. Next, at Step 1414, the process may receive, at the base station, a second UL transmission from the first user device, wherein the first user device uses the second selected antenna panel and the second configuration information corresponding to the selected second antenna panel. Finally, e.g., due to the selection of a new antenna panel, at Step 1416, the process may receive, at the base station, a power headroom report (PHR) from the first user device, wherein the PHR corresponds to the selected second antenna panel. Elements 1410-1416 are shown in dashed line boxes to indicate that their performance, i.e., the updating of the antenna panel that is to be used for UL transmission, is optional, according to some aspects.

Figure 15:
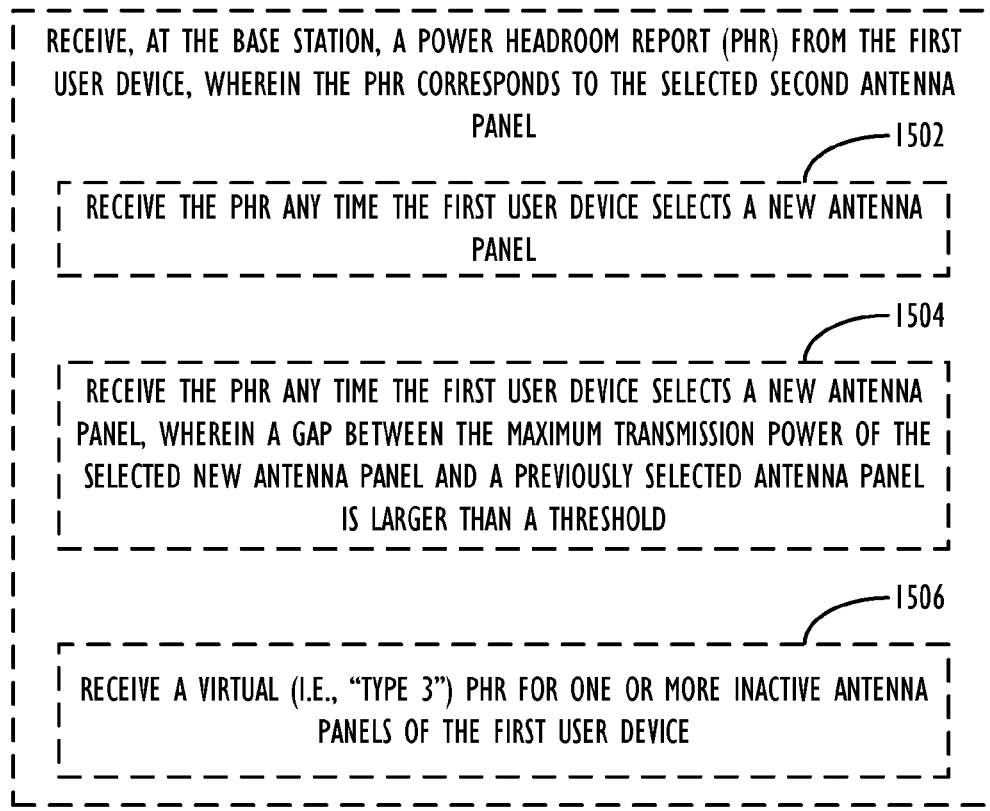
FIG. 15 illustrates exemplary conditions for triggering PHR receiving by a base station, according to some aspects.

Turning now to FIG. 15, exemplary conditions 1502/1504/1506 for triggering PHR receiving by a base station are shown, according to some aspects. Conditions 1502/1504/1506 represent additional possible implementation details related to Step 1314 of FIG. 13 and Step 1416 of FIG. 14. In particular, condition 1502 indicates that the base station may receive the PHR any time the first user device selects a new antenna panel. Condition 1504 indicates that the base station may receive the PHR any time the first user device selects a new antenna panel, wherein a gap between the maximum transmission power of the selected new antenna panel and a previously selected antenna panel is larger than a threshold (e.g., a predetermined or configurable maximum transmission power difference threshold). As may be understood, condition 1504 may be utilized to attempt to prevent over-signaling of PHR to the base station. Condition 1506 indicates that the base station may also receive a "virtual PHR" for one or more inactive antenna panels of the user device, e.g., whenever a "normal" or "Type 1" PHR is triggered at the UE. Additional details regarding virtual PHRs are described above, with reference to FIG. 12.

EXAMPLES

In the following sections, further examples are provided.

According to example 1, a method for communication in a wireless system is disclosed, comprising: transmitting to a base station, via a user device: (1) a capability report for each of a plurality of antenna panels; and (2) an initial antenna panel index; receiving from the base station, at the user device, configuration information corresponding to each antenna panel of the plurality of antenna panels; selecting, at the user device, a first antenna panel for a first uplink (UL) transmission to the base station, wherein the first antenna panel corresponds to the antenna panel with the initial antenna panel index; selecting, at the user device, first configuration information corresponding to the selected first antenna panel; and transmitting the first UL transmission to the base station, via the user device, using the selected first antenna panel and the selected first configuration information.

Example 2 comprises the subject matter of example 1, further comprising: selecting, at the user device, a second antenna panel for a second UL transmission to the base station; selecting, at the user device, second configuration information corresponding to the second antenna panel; and transmitting the second UL transmission to the base station, via the user device, using the selected second antenna panel and the selected second configuration information.

Example 3 comprises the subject matter of example 2, further comprising: transmitting a power headroom report (PHR) to the base station, via the user device, wherein the PHR corresponds to the selected second antenna panel.

Example 4 comprises the subject matter of example 3, wherein transmitting the PHR to the base station further comprises at least one of the following: transmitting the PHR to the base station any time the user device selects a new antenna panel; transmitting the PHR any time the user device selects a new antenna panel, wherein a gap between the maximum transmission power of the selected new antenna panel and a previously selected antenna panel is larger than a threshold; or transmitting a virtual PHR for one or more inactive antenna panels of the user device.

Example 5 comprises the subject matter of example 1, wherein the capability report for each of a plurality of antenna panels comprises an indication of at least one of the following properties of the user device: a maximum number of SRS resources available for beam management; a maximum number of Rx/Tx beams; whether the user device can support uplink full power transmission, for any supported uplink full power transmission mode, the parameters for such mode; a maximum number of ports available per SRS resource; an uplink codebook subset; a maximum number of layers available for uplink transmission; or a supported SRS for an antenna switching configuration.

According to example 6, a method for communication in a wireless system is disclosed, comprising: transmitting to a base station, via a user device: (1) a capability report for each of a plurality of antenna panels; and (2) an initial antenna panel index; receiving from the base station, at the user device, configuration information corresponding to the antenna panel with the initial antenna panel index; selecting, at the user device, a first antenna panel for a first uplink (UL) transmission to the base station, wherein the first antenna panel corresponds to the antenna panel with the initial antenna panel index; and transmitting the first UL transmission to the base station, via the user device, using the selected first antenna panel and the received configuration information corresponding to the selected first antenna panel.

Example 7 comprises the subject matter of example 6, further comprising: selecting, at the user device, a second antenna panel for a second UL transmission to the base station; receiving from the base station, at the user device, configuration information corresponding to the selected second antenna panel: and transmitting the second UL transmission to the base station, via the user device, using the selected second antenna panel and the received configuration information corresponding to the selected second antenna panel.

Example 8 comprises the subject matter of example 7, further comprising: transmitting a power headroom report (PHR) to the base station, via the user device, wherein the PHR corresponds to the selected second antenna panel.

Example 9 comprises the subject matter of example 8, wherein transmitting the PHR to the base station further comprises at least one of the following: transmitting the PHR to the base station any time the user device selects a new antenna panel; transmitting the PHR any time the user device selects a new antenna panel, wherein a gap between the maximum transmission power of the selected new antenna panel and a previously selected antenna panel is larger than a threshold; or transmitting a virtual PHR for one or more inactive antenna panels of the user device.

Example 10 comprises the subject matter of example 6, wherein the capability report for each of a plurality of antenna panels comprises an indication of at least one of the following properties of the user device: a maximum number of SRS resources available for beam management; a maximum number of Rx/Tx beams; whether the user device can support uplink full power transmission; for any supported uplink full power transmission mode, the parameters for such mode, a maximum number of ports available per SRS resource; an uplink codebook subset, a maximum number of layers available for uplink transmission; or a supported SRS for an antenna switching configuration.

According to example 11, a user device is disclosed, comprising: a plurality of antenna panels; a radio operably coupled to the plurality of antenna panels; and a processor operably coupled to the radio; wherein the user device is configured to: transmit to a base station: (1) a capability report for each antenna panel of the plurality of antenna panels; and (2) an initial antenna panel index; receive, from the base station, configuration information corresponding to each antenna panel of the plurality of antenna panels; select a first antenna panel for a first uplink (UL) transmission to the base station, wherein the first antenna panel corresponds to the antenna panel with the initial antenna panel index; select first configuration information corresponding to the selected first antenna panel; and transmit the first UL transmission to the base station, using the selected first antenna panel and the selected first configuration information.

Example 12 comprises the subject matter of example 11, wherein the user device is further configured to: select a second antenna panel for a second UL transmission to the base station: select second configuration information corresponding to the second antenna panel: and transmit the second UL transmission to the base station, using the selected second antenna panel and the selected second configuration information.

Example 13 comprises the subject matter of example 12, wherein the user device is further configured to: transmit a power headroom report (PHR) to the base station, wherein the PHR corresponds to the selected second antenna panel.

Example 14 comprises the subject matter of example 13, wherein transmitting the PHR to the base station further comprises the user device being configured to perform at least one of the following operations: transmit the PHR to the base station any time the user device selects a new antenna panel, transmit the PHR any time the user device selects a new antenna panel, wherein a gap between the maximum transmission power of the selected new antenna panel and a previously selected antenna panel is larger than a threshold; or transmit a virtual PHR for one or more inactive antenna panels of the user device.

Example 15 comprises the subject matter of example 11, wherein the capability report for each of a plurality of antenna panels comprises an indication of at least one of the following properties of the user device: a maximum number of SRS resources available for beam management; a maximum number of Rx/Tx beams; whether the user device can support uplink full power transmission, for any supported uplink full power transmission mode, the parameters for such mode; a maximum number of ports available per SRS resource; an uplink codebook subset; a maximum number of layers available for uplink transmission; or a supported SRS for an antenna switching configuration.

According to example 16, a user device is disclosed,: a plurality of antenna panels; a radio operably coupled to the plurality of antenna panels; and a processor operably coupled to the radio; wherein the user device is configured to: transmit to a base station: (1) a capability report for each antenna panel of a plurality of antenna panels; and (2) an initial antenna panel index; receive, from the base station, configuration information corresponding to the antenna panel with the initial antenna panel index; select, at the user device, a first antenna panel for a first uplink (UL) transmission to the base station, wherein the first antenna panel corresponds to the antenna panel with the initial antenna panel index; and transmit the first UL transmission to the base station, using the selected first antenna panel and the received configuration information corresponding to the selected first antenna panel.

Example 17 comprises the subject matter of example 16, wherein the user device is further configured to: select a second antenna panel for a second UL transmission to the base station; receive, from the base station, at the user device, configuration information corresponding to the selected second antenna panel; and transmit the second UL transmission to the base station, using the selected second antenna panel and the received configuration information corresponding to the selected second antenna panel.

Example 18 comprises the subject matter of example 17, wherein the user device is further configured to: transmit a power headroom report (PHR) to the base station, wherein the PHR corresponds to the selected second antenna panel.

Example 19 comprises the subject matter of example 18, wherein transmitting the PHR to the base station further comprises the user device being configured to perform at least one of the following operations: transmit the PHR to the base station any time the user device selects a new antenna panel, transmit the PHR any time the user device selects a new antenna panel, wherein a gap between the maximum transmission power of the selected new antenna panel and a previously selected antenna panel is larger than a threshold; or transmit a virtual PHR for one or more inactive antenna panels of the user device.

Example 20 comprises the subject matter of example 16, wherein the capability report for each of a plurality of antenna panels comprises an indication of at least one of the following properties of the user device: a maximum number of SRS resources available for beam management; a maximum number of Rx/Tx beams; whether the user device can support uplink full power transmission; for any supported uplink full power transmission mode, the parameters for such mode; a maximum number of ports available per SRS resource; an uplink codebook subset; a maximum number of layers available for uplink transmission; or a supported SRS for an antenna switching configuration.

According to example 21, an integrated circuit is disclosed, comprising circuitry configured to cause a user device to: transmit to a base station: (1) a capability report for each antenna panel of a plurality of antenna panels; and (2) an initial antenna panel index; receive, from the base station, configuration information corresponding to each antenna panel of the plurality of antenna panels; select a first antenna panel for a first uplink (UL) transmission to the base station, wherein the first antenna panel corresponds to the antenna panel with the initial antenna panel index; select first configuration information corresponding to the selected first antenna panel; and transmit the first UL transmission to the base station, using the selected first antenna panel and the selected first configuration information.

Example 22 comprises the subject matter of example 21, wherein the circuitry is further configured to cause the user device to: select a second antenna panel for a second UL transmission to the base station; select second configuration information corresponding to the second antenna panel; and transmit the second UL transmission to the base station, using the selected second antenna panel and the selected second configuration information.

Example 23 comprises the subject matter of example 22, wherein the circuitry is further configured to cause the user device to: transmit a power headroom report (PHR) to the base station, wherein the PHR corresponds to the selected second antenna panel.

Example 24 comprises the subject matter of example 23, wherein transmitting the PHR to the base station further comprises the circuitry being further configured to cause the user device to perform at least one of the following operations: transmit the PHR to the base station any time the user device selects a new antenna panel; transmit the PHR any time the user device selects a new antenna panel, wherein a gap between the maximum transmission power of the selected new antenna panel and a previously selected antenna panel is larger than a threshold; or transmit a virtual PHR for one or more inactive antenna panels of the user device.

Example 25 comprises the subject matter of example 21, wherein the capability report for each of a plurality of antenna panels comprises an indication of at least one of the following properties of the user device: a maximum number of SRS resources available for beam management; a maximum number of Rx/Tx beams; whether the user device can support uplink full power transmission; for any supported uplink full power transmission mode, the parameters for such mode; a maximum number of ports available per SRS resource; an uplink codebook subset; a maximum number of layers available for uplink transmission; or a supported SRS for an antenna switching configuration.

According to example 26, an integrated circuit is disclosed, comprising circuitry configured to cause a user device to: transmit to a base station: (1) a capability report for each antenna panel of a plurality of antenna panels; and (2) an initial antenna panel index; receive, from the base station, configuration information corresponding to the antenna panel with the initial antenna panel index; select, at the user device, a first antenna panel for a first uplink (UL) transmission to the base station, wherein the first antenna panel corresponds to the antenna panel with the initial antenna panel index; and transmit the first UL transmission to the base station, using the selected first antenna panel and the received configuration information corresponding to the selected first antenna panel.

Example 27 comprises the subject matter of example 26, wherein the circuitry is further configured to cause the user device to: select a second antenna panel for a second UL transmission to the base station; receive, from the base station, at the user device, configuration information corresponding to the selected second antenna panel; and transmit the second UL transmission to the base station, using the selected second antenna panel and the received configuration information corresponding to the selected second antenna panel.

Example 28 comprises the subject matter of example 27, wherein the circuitry is further configured to cause the user device to: transmit a power headroom report (PHR) to the base station, wherein the PHR corresponds to the selected second antenna panel.

Example 29 comprises the subject matter of example 28, wherein transmitting the PHR to the base station further comprises the circuitry being further configured to cause the user device to perform at least one of the following operations: transmit the PHR to the base station any time the user device selects a new antenna panel; transmit the PHR any time the user device selects a new antenna panel, wherein a gap between the maximum transmission power of the selected new antenna panel and a previously selected antenna panel is larger than a threshold; or transmit a virtual PHR for one or more inactive antenna panels of the user device.

Example 30 comprises the subject matter of example 26, wherein the capability report for each of a plurality of antenna panels comprises an indication of at least one of the following properties of the user device: a maximum number of SRS resources available for beam management; a maximum number of Rx/Tx beams; whether the user device can support uplink full power transmission; for any supported uplink full power transmission mode, the parameters for such mode, a maximum number of ports available per SRS resource; an uplink codebook subset; a maximum number of layers available for uplink transmission; or a supported SRS for an antenna switching configuration.

According to example 31, a method for communication in a wireless system is disclosed, comprising: receiving, at a base station: (1) a capability report for each of a plurality of antenna panels of a first user device; and (2) an initial antenna panel index for the first user device; transmitting, from the base station, to the first user device, configuration information corresponding to each antenna panel of the plurality of antenna panels of the first user device; selecting, at the base station, first configuration information corresponding to the antenna panel of the first user device with the initial antenna panel index; and receiving, at the base station, a first uplink (UL) transmission from the first user device, wherein the first user device uses a selected first antenna panel corresponding to the initial antenna panel index and the first configuration information corresponding to the selected first antenna panel.

Example 32 comprises the subject matter of example 31, further comprising: selecting, at the base station, second configuration information corresponding to a selected second antenna panel of the first user device; and receiving, at the base station, a second UL transmission from the first user device, wherein the first user device uses the second selected antenna panel and the second configuration information corresponding to the selected second antenna panel.

Example 33 comprises the subject matter of example 32, further comprising: receiving, at the base station, a power headroom report (PHR) from the first user device, wherein the PHR corresponds to the selected second antenna panel.

Example 34 comprises the subject matter of example 33, wherein receiving the PHR at the base station further comprises the base station performing at least one of the following operations: receiving the PHR any time the first user device selects a new antenna panel; receiving the PHR any time the first user device selects a new antenna panel, wherein a gap between the maximum transmission power of the selected new antenna panel and a previously selected antenna panel is larger than a threshold; or receiving a virtual PHR for one or more inactive antenna panels of the first user device.

Example 35 comprises the subject matter of example 31, wherein the capability report for each of a plurality of antenna panels of the first user device comprises an indication of at least one of the following properties of the first user device: a maximum number of SRS resources available for beam management; a maximum number of Rx/Tx beams; whether the first user device can support uplink full power transmission; for any supported uplink full power transmission mode, the parameters for such mode; a maximum number of ports available per SRS resource, an uplink codebook subset; a maximum number of layers available for uplink transmission; or a supported SRS for an antenna switching configuration.

According to example 36, a method for communication in a wireless system is disclosed, comprising: receiving, at a base station: (1) a capability report for each of a plurality of antenna panels of a first user device; and (2) an initial antenna panel index for the first user device; transmitting, from the base station, to the first user device, configuration information corresponding to the antenna panel of the first user device with the initial antenna panel index; selecting, at the base station, first configuration information corresponding to the antenna panel of the first user device with the initial antenna panel index; and receiving, at the base station, a first uplink (UL) transmission from the first user device, wherein the first user device uses a selected first antenna panel corresponding to the initial antenna panel index and the first configuration information corresponding to the selected first antenna panel.

Example 37 comprises the subject matter of example 36, further comprising: selecting, at the base station, second configuration information corresponding to a selected second antenna panel of the first user device; transmitting, from the base station, to the first user device, configuration information corresponding to the selected second antenna panel of the first user device; receiving, at the base station, a second UL transmission from the first user device, wherein the first user device uses the second selected antenna panel and the second configuration information corresponding to the selected second antenna panel.

Example 38 comprises the subject matter of example 37, further comprising: receiving, at the base station, a power headroom report (PHR) from the first user device, wherein the PHR corresponds to the selected second antenna panel.

Example 39 comprises the subject matter of example 38, wherein receiving the PHR at the base station further comprises the base station performing at least one of the following operations: receiving the PHR any time the first user device selects a new antenna panel; receiving the PHR any time the first user device selects a new antenna panel, wherein a gap between the maximum transmission power of the selected new antenna panel and a previously selected antenna panel is larger than a threshold; or receiving a virtual PHR for one or more inactive antenna panels of the first user device.

Example 40 comprises the subject matter of example 36, wherein the capability report for each of a plurality of antenna panels of the first user device comprises an indication of at least one of the following properties of the first user device: a maximum number of SRS resources available for beam management; a maximum number of Rx/Tx beams; whether the first user device can support uplink full power transmission; for any supported uplink full power transmission mode, the parameters for such mode; a maximum number of ports available per SRS resource; an uplink codebook subset; a maximum number of layers available for uplink transmission; or a supported SRS for an antenna switching configuration.

According to example 41, a base station is disclosed, comprising: one or more antenna panels; a radio operably coupled to the one or more antenna panels; and a processor operably coupled to the radio; wherein the base station is configured to: receive: (1) a capability report for each of a plurality of antenna panels of a first user device; and (2) an initial antenna panel index for the first user device; transmit, to the first user device, configuration information corresponding to each antenna panel of the plurality of antenna panels of the first user device; select first configuration information corresponding to the antenna panel of the first user device with the initial antenna panel index; and receive a first uplink (UL) transmission from the first user device, wherein the first user device uses a selected first antenna panel corresponding to the initial antenna panel index and the first configuration information corresponding to the selected first antenna panel.

Example 42 comprises the subject matter of example 41, wherein the base station is further configured to: select second configuration information corresponding to a selected second antenna panel of the first user device; and receive a second UL transmission from the first user device, wherein the first user device uses the second selected antenna panel and the second configuration information corresponding to the selected second antenna panel.

Example 43 comprises the subject matter of example 42, wherein the base station is further configured to: receive a power headroom report (PHR) from the first user device, wherein the PHR corresponds to the selected second antenna panel.

Example 44 comprises the subject matter of example 43, wherein receiving the PHR at the base station further comprises the base station being configured to perform at least one of the following operations: receive the PHR any time the first user device selects a new antenna panel; receive the PHR any time the first user device selects a new antenna panel, wherein a gap between the maximum transmission power of the selected new antenna panel and a previously selected antenna panel is larger than a threshold; or receive a virtual PHR for one or more inactive antenna panels of the first user device.

Example 45 comprises the subject matter of example 41, wherein the capability report for each of a plurality of antenna panels of the first user device comprises an indication of at least one of the following properties of the first user device: a maximum number of SRS resources available for beam management; a maximum number of Rx/Tx beams;

whether the first user device can support uplink full power transmission; for any supported uplink full power transmission mode, the parameters for such mode; a maximum number of ports available per SRS resource; an uplink codebook subset; a maximum number of layers available for uplink transmission; or a supported SRS for an antenna switching configuration.

According to example 46, a base station is disclosed, comprising: one or more antenna panels; a radio operably coupled to the one or more antenna panels; and a processor operably coupled to the radio; wherein the base station is configured to: receive: (1) a capability report for each of a plurality of antenna panels of a first user device; and (2) an initial antenna panel index for the first user device; transmit, to the first user device, configuration information corresponding to the antenna panel of the first user device with the initial antenna panel index; select first configuration information corresponding to the antenna panel of the first user device with the initial antenna panel index; and receive a first uplink (UL) transmission from the first user device, wherein the first user device uses a selected first antenna panel corresponding to the initial antenna panel index and the first configuration information corresponding to the selected first antenna panel.

Example 47 comprises the subject matter of example 46, wherein the base station is further configured to: select second configuration information corresponding to a selected second antenna panel of the first user device; transmit, to the first user device, configuration information corresponding to the selected second antenna panel of the first user device, receive a second UL transmission from the first user device, wherein the first user device uses the second selected antenna panel and the second configuration information corresponding to the selected second antenna panel.

Example 48 comprises the subject matter of example 47, wherein the base station is further configured to: receive a power headroom report (PHR) from the first user device, wherein the PHR corresponds to the selected second antenna panel.

Example 49 comprises the subject matter of example 48, wherein receiving the PHR at the base station further comprises the base station being configured to perform at least one of the following operations: receive the PHR any time the first user device selects a new antenna panel; receive the PHR any time the first user device selects a new antenna panel, wherein a gap between the maximum transmission power of the selected new antenna panel and a previously selected antenna panel is larger than a threshold; or receive a virtual PHR for one or more inactive antenna panels of the first user device.

Example 50 comprises the subject matter of example 46, wherein the capability report for each of a plurality of antenna panels of the first user device comprises an indication of at least one of the following properties of the first user device: a maximum number of SRS resources available for beam management; a maximum number of Rx/Tx beams; whether the first user device can support uplink full power transmission; for any supported uplink full power transmission mode, the parameters for such mode; a maximum number of ports available per SRS resource; an uplink codebook subset; a maximum number of layers available for uplink transmission; or a supported SRS for an antenna switching configuration.

According to example 51, an integrated circuit is disclosed, comprising circuitry configured to cause a base station to: receive: (1) a capability report for each of a plurality of antenna panels of a first user device; and (2) an initial antenna panel index for the first user device; transmit, to the first user device, configuration information corresponding to each antenna panel of the plurality of antenna panels of the first user device: select first configuration information corresponding to the antenna panel of the first user device with the initial antenna panel index; and receive a first uplink (UL) transmission from the first user device, wherein the first user device uses a selected first antenna panel corresponding to the initial antenna panel index and the first configuration information corresponding to the selected first antenna panel.

Example 52 comprises the subject matter of example 51, wherein the circuitry is further configured to cause the base station to: select second configuration information corresponding to a selected second antenna panel of the first user device: and receive a second UL transmission from the first user device, wherein the first user device uses the second selected antenna panel and the second configuration information corresponding to the selected second antenna panel.

Example 53 comprises the subject matter of example 52, wherein the circuitry is further configured to cause the base station to: receive a power headroom report (PHR) from the first user device, wherein the PHR corresponds to the selected second antenna panel.

Example 54 comprises the subject matter of example 53, wherein receiving the PHR at the base station further comprises the circuitry being further configured to cause the base station to perform at least one of the following operations: receive the PHR any time the first user device selects a new antenna panel; receive the PHR any time the first user device selects a new antenna panel, wherein a gap between the maximum transmission power of the selected new antenna panel and a previously selected antenna panel is larger than a threshold; or receive a virtual PHR for one or more inactive antenna panels of the first user device.

Example 55 comprises the subject matter of example 51, wherein the capability report for each of a plurality of antenna panels of the first user device comprises an indication of at least one of the following properties of the first user device: a maximum number of SRS resources available for beam management; a maximum number of Rx/Tx beams; whether the first user device can support uplink full power transmission; for any supported uplink full power transmission mode, the parameters for such mode; a maximum number of ports available per SRS resource; an uplink codebook subset; a maximum number of layers available for uplink transmission; or a supported SRS for an antenna switching configuration.

According to example 56, an integrated circuit is disclosed comprising circuitry configured to cause a base station to: receive: (1) a capability report for each of a plurality of antenna panels of a first user device; and (2) an initial antenna panel index for the first user device; transmit, to the first user device, configuration information corresponding to the antenna panel of the first user device with the initial antenna panel index; select first configuration information corresponding to the antenna panel of the first user device with the initial antenna panel index; and receive a first uplink (UL) transmission from the first user device, wherein the first user device uses a selected first antenna panel corresponding to the initial antenna panel index and the first configuration information corresponding to the selected first antenna panel.

Example 57 comprises the subject matter of example 56, wherein the circuitry is further configured to cause the base station to: select second configuration information corresponding to a selected second antenna panel of the first user device; transmit, to the first user device, configuration information corresponding to the selected second antenna panel of the first user device; receive a second UL transmission from the first user device, wherein the first user device uses the second selected antenna panel and the second configuration information corresponding to the selected second antenna panel.

Example 58 comprises the subject matter of example 57, wherein the circuitry is further configured to cause the base station to: receive a power headroom report (PHR) from the first user device, wherein the PHR corresponds to the selected second antenna panel.

Example 59 comprises the subject matter of example 58, wherein receiving the PHR at the base station further comprises the circuitry being further configured to cause the base station to perform at least one of the following operations: receive the PHR any time the first user device selects a new antenna panel; receive the PHR any time the first user device selects a new antenna panel, wherein a gap between the maximum transmission power of the selected new antenna panel and a previously selected antenna panel is larger than a threshold; or receive a virtual PHR for one or more inactive antenna panels of the first user device.

Example 60 comprises the subject matter of example 56, wherein the capability report for each of a plurality of antenna panels of the first user device comprises an indication of at least one of the following properties of the first user device: a maximum number of SRS resources available for beam management; a maximum number of Rx/Tx beams; whether the first user device can support uplink full power transmission; for any supported uplink full power transmission mode, the parameters for such mode; a maximum number of ports available per SRS resource; an uplink codebook subset; a maximum number of layers available for uplink transmission; or a supported SRS for an antenna switching configuration.

Yet another example may include a method, comprising, by a device, performing any or all parts of the preceding examples.

A yet further exemplary embodiment may include a non-transitory computer-accessible memory medium comprising program instructions which, when executed at a device, cause the device to implement any or all parts of any of the preceding Examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of the methods described herein, or, any combination of the methods described herein, or, any subset of any of the methods described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various methods described herein (or, any combination of the methods described herein, or, any subset of any of the methods described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for communication in a wireless system, comprising:
   receiving, at a base station: (1) a capability report for each of a plurality of antenna panels of a user device; and (2) an initial antenna panel index for the user device;
   transmitting, from the base station, to the user device, configuration information corresponding to each antenna panel of the plurality of antenna panels of the user device;
   selecting, at the base station, first configuration information corresponding to a first antenna panel of the user device with the initial antenna panel index; and
   receiving, at the base station, a first uplink (UL) transmission from the user device, wherein the UL transmission is transmitted using the first antenna panel corresponding to the initial antenna panel index and the first configuration information, and
   receiving, at the base station, a power headroom report (PHR) from the user device, wherein the PHR corresponds to a second antenna panel, wherein a gap between a maximum transmission power of the second antenna panel and the first antenna panel is larger than a threshold.

2. The method of claim 1, further comprising:
   selecting, at the base station, second configuration information corresponding to the second antenna panel of the user device; and
   receiving, at the base station, a second UL transmission from the user device, wherein the user device uses the second antenna panel and the second configuration information corresponding to the second antenna panel.

3. The method of claim 1, wherein receiving the PHR at the base station further comprises the base station performing at least one of the following operations:
   receiving the PHR any time the first user device selects a new antenna panel; or
   receiving a virtual PHR for one or more inactive antenna panels of the user device.

4. The method of claim 1, wherein the capability report for each of a plurality of antenna panels of the user device comprises an indication of at least one of the following properties of the user device:
- a maximum number of SRS resources available for beam management;
- a maximum number of Rx/Tx beams;
- whether the user device can support uplink full power transmission;
- for any supported uplink full power transmission mode, the parameters for such mode;
- a maximum number of ports available per SRS resource;
- an uplink codebook subset;
- a maximum number of layers available for uplink transmission; or
- a supported SRS for an antenna switching configuration.

5. A base station comprising:
- one or more antenna panels;
- a radio operably coupled to the one or more antenna panels; and
- a processor operably coupled to the radio;
- wherein the base station is configured to:
  - receive: (1) a capability report for each of a plurality of antenna panels of a user device; and (2) an initial antenna panel index for the user device;
  - transmit, to the user device, configuration information corresponding to a first antenna panel of the user device with the initial antenna panel index;
  - select configuration information corresponding to the antenna panel of the user device with the initial antenna panel index; and
  - receive a first uplink (UL) transmission from the user device, wherein the UL transmission is transmitted using the first antenna panel corresponding to the initial antenna panel index and the first configuration information, and
  - receiving, at the base station, a power headroom report (PHR) from the user device, wherein the PHR corresponds to a second antenna panel, wherein a gap between a maximum transmission power of the second antenna panel and the first antenna panel is larger than a threshold.

6. The base station of claim 5, wherein the base station is further configured to:
- select second configuration information corresponding to the second antenna panel of the user device;
- transmit, to the user device, configuration information corresponding to the second antenna panel of the user device;
- receive a second UL transmission from the user device, wherein the user device uses the second antenna panel and the second configuration information corresponding to the second antenna panel.

7. The base station of claim 6, wherein receiving the PHR at the base station further comprises the base station being configured to perform at least one of the following operations:
- receive the PHR any time the user device selects a new antenna panel; or
- receive a virtual PHR for one or more inactive antenna panels of the user device.

8. The base station of claim 5, wherein the capability report for each of a plurality of antenna panels of the user device comprises an indication of at least one of the following properties of the user device:
- a maximum number of SRS resources available for beam management;
- a maximum number of Rx/Tx beams;
- whether the user device can support uplink full power transmission;
- for any supported uplink full power transmission mode, the parameters for such mode;
- a maximum number of ports available per SRS resource;
- an uplink codebook subset;
- a maximum number of layers available for uplink transmission; or
- a supported SRS for an antenna switching configuration.

9. An integrated circuit, comprising circuitry configured to cause a base station to:
- receive: (1) a capability report for each of a plurality of antenna panels of a user device; and (2) an initial antenna panel index for the user device;
- transmit, to the user device, configuration information corresponding to each antenna panel of the plurality of antenna panels of the user device;
- select first configuration information corresponding to a first antenna panel of the user device with the initial antenna panel index; and
- receive a first uplink (UL) transmission from the user device, wherein the UL transmission is transmitted using the first antenna panel corresponding to the initial antenna panel index and the first configuration information, and
- receiving, at the base station, a power headroom report (PHR) from the user device, wherein the PHR corresponds to a second antenna panel, wherein a gap between a maximum transmission power of the second antenna panel and the first antenna panel is larger than a threshold.

10. The integrated circuit of claim 9, wherein the circuitry is further configured to cause the base station to:
- select second configuration information corresponding to the second antenna panel of the user device; and
- receive a second UL transmission from the user device, wherein the user device uses the second antenna panel and the second configuration information corresponding to the second antenna panel.

11. The integrated circuit of claim 10, wherein receiving the PHR at the base station further comprises the circuitry being further configured to cause the base station to perform at least one of the following operations:
- receive the PHR any time the user device selects a new antenna panel; or
- receive a virtual PHR for one or more inactive antenna panels of the user device.

12. The integrated circuit of claim 9, wherein the capability report for each of a plurality of antenna panels of the user device comprises an indication of at least one of the following properties of the user device:
- a maximum number of SRS resources available for beam management;
- a maximum number of Rx/Tx beams;
- whether the user device can support uplink full power transmission;
- for any supported uplink full power transmission mode, the parameters for such mode;
- a maximum number of ports available per SRS resource;
- an uplink codebook subset;
- a maximum number of layers available for uplink transmission; or
- a supported SRS for an antenna switching configuration.

* * * * *

UNITED STATES PATENT AND TRADEMARK OFFICE
CERTIFICATE OF CORRECTION

Page 1 of 1

PATENT NO. : 12,143,186 B2
APPLICATION NO. : 17/593809
DATED : November 12, 2024
INVENTOR(S) : Yushu Zhang et al.

It is certified that error appears in the above-identified patent and that said Letters Patent is hereby corrected as shown below:

In the Claims

Claim 3, Column 30, Line 64: delete the word "first" before -- user --

Signed and Sealed this
Seventeenth Day of December, 2024

Derrick Brent
*Acting Director of the United States Patent and Trademark Office*